United States Patent [19]
Toshimitsu et al.

[11] Patent Number: 4,618,018
[45] Date of Patent: Oct. 21, 1986

[54] POWER STEERING DEVICE FOR VEHICLES

[75] Inventors: Yoshihiko Toshimitsu, Asaka; Tokuro Takaoka, Tokyo; Toshitake Kawai, Kawagoe; Takashi Ishida, Kawaguchi, all of Japan

[73] Assignee: Honda Giken Kogyo Kabushiki Kaisha, Tokyo, Japan

[21] Appl. No.: 714,333

[22] Filed: Mar. 21, 1985

[30] Foreign Application Priority Data

Mar. 29, 1984 [JP] Japan .................................. 59-61872

[51] Int. Cl.⁴ .............................................. B62D 5/06
[52] U.S. Cl. .................................. 180/142; 417/282; 417/283; 418/134
[58] Field of Search ............... 180/132, 141, 142, 143; 417/282, 283, 293; 418/132, 134

[56] References Cited

U.S. PATENT DOCUMENTS

| | | | |
|---|---|---|---|
| 3,822,965 | 7/1974 | Drutchas et al. | 417/283 X |
| 3,844,685 | 10/1974 | Eickmann | 418/132 X |
| 3,904,333 | 9/1975 | Stoeckelmann | 418/132 |
| 3,951,575 | 4/1976 | Motomura et al. | 417/283 |
| 4,014,630 | 3/1977 | Drutchas | 417/283 |
| 4,408,963 | 10/1983 | Drutchas | 417/283 |
| 4,437,532 | 3/1984 | Nakamura et al. | 180/142 |

Primary Examiner—John J. Love
Assistant Examiner—Charles R. Watts
Attorney, Agent, or Firm—Armstrong, Nikaido, Marmelstein & Kubovcik

[57] ABSTRACT

A power steering device for vehicles having a simple construction, which is capable of minimizing the frictional loss of a hydraulic pump as well as the power consumption of the hydraulic pump and engine. This power steering device comprises a hydraulic pump constructed such that a pressure member is provided in a pump casing and defines an inner side wall of a pump chamber on at least one axial side of a rotary shaft of the pump, the pressure members being movable in the axial direction of the shaft; that a hydraulic chamber, which is provided on a side of the pressure member opposite the pump chamber and which faces an end portion of the pressure member, communicates with a discharge port of the hydraulic pump; and that an electromagnetic change-over valve is interposed in an oil passage connecting between the hydraulic chamber and a suction port of the hydraulic pump and is adapted to place the latters in mutual communication through opening operation thereof upon receipt of a signal from a detector which detects the moment when supplementary should be reduced.

5 Claims, 3 Drawing Figures

POWER STEERING DEVICE FOR VEHICLES

BACKGROUND OF THE INVENTION

1. Field of the Invention

This invention relates to a power steering device for vehicles.

2. Description of the Prior Art

In a conventional power steering device for vehicles, the capacity of a hydraulic pump is set so that pressure oil can be supplied to a power cylinder at a sufficiently high flow rate while the pump is operated with the engine idling. While the vehicle runs at a high speed or straight forward, i.e., while power assistance is not required, engine power is consumed wastefully due to the pumping loss of the hydraulic pump which has a comparatively large capacity.

With a view to solving this problem, (a) a power steering device in which a clutch or a speed change gear is provided between a pump and a pulley to control the discharge rate of the pump, (b) a power steering device in which a pump is actuated by an electric motor to control the discharge rate thereof, (c) a power steering device in which two pumps of different capacities are used each in its proper way, and (d) a power steering device having a pump of a variable capacity, have already been proposed or practically used. However, the above power steering devices (a)-(c) force the structure of a conventional pump, when used therein, to be greatly changed. This increases the manufacturing cost and the weight of the power steering device. In the above power steering device (d), a decrease in friction loss is unlikely expected.

SUMMARY OF THE INVENTION

The present invention has been developed in view of these circumstances. It is an object of the present invention to provide a power steering device for vehicles, having a simple construction, and which is capable of minimizing frictional loss of a hydraulic pump.

To achieve the above object, according to the invention, there is provided a power steering device for vehicles, comprising a hydraulic pump, hydraulic pump including a pump casing, a rotary shaft having an axis, a pump chamber defined in pump casing, and a suction port and a discharge port, wherein a pressure member is provided in said pump casing on at least one axial side of said rotary shaft to constitute an inner side wall of said pump chamber pressure member being movable along the axis of the rotary shaft; a hydraulic chamber is provided on a side of the pressure member opposite the pump chamber such that the hydraulic chamber faces an end portion of the pressure member and communicates with the discharge port of the hydraulic pump; and the hydraulic chamber and the suction port of the hydraulic pump are placed in communication with each other through operations of an electromagnetic change-over valve which is operated to open in response to a signal from a detector which senses when supplementary power should be reduced.

The above and other objects as well as advantageous features of the invention will become apparent from the following description of the preferred embodiments taken in conjunction with the accompanying drawings.

BRIEF DESCRIPTION OF THE DRAWINGS

FIGS. 1 and 2 illustrate a first embodiment of the present invention wherein:

FIG. 1 is a sectional side elevation, and

FIG. 2 is a sectional view taken along the line II—II in FIG. 1; and

DESCRIPTION OF THE PREFERRED EMBODIMENTS

Figure 1:
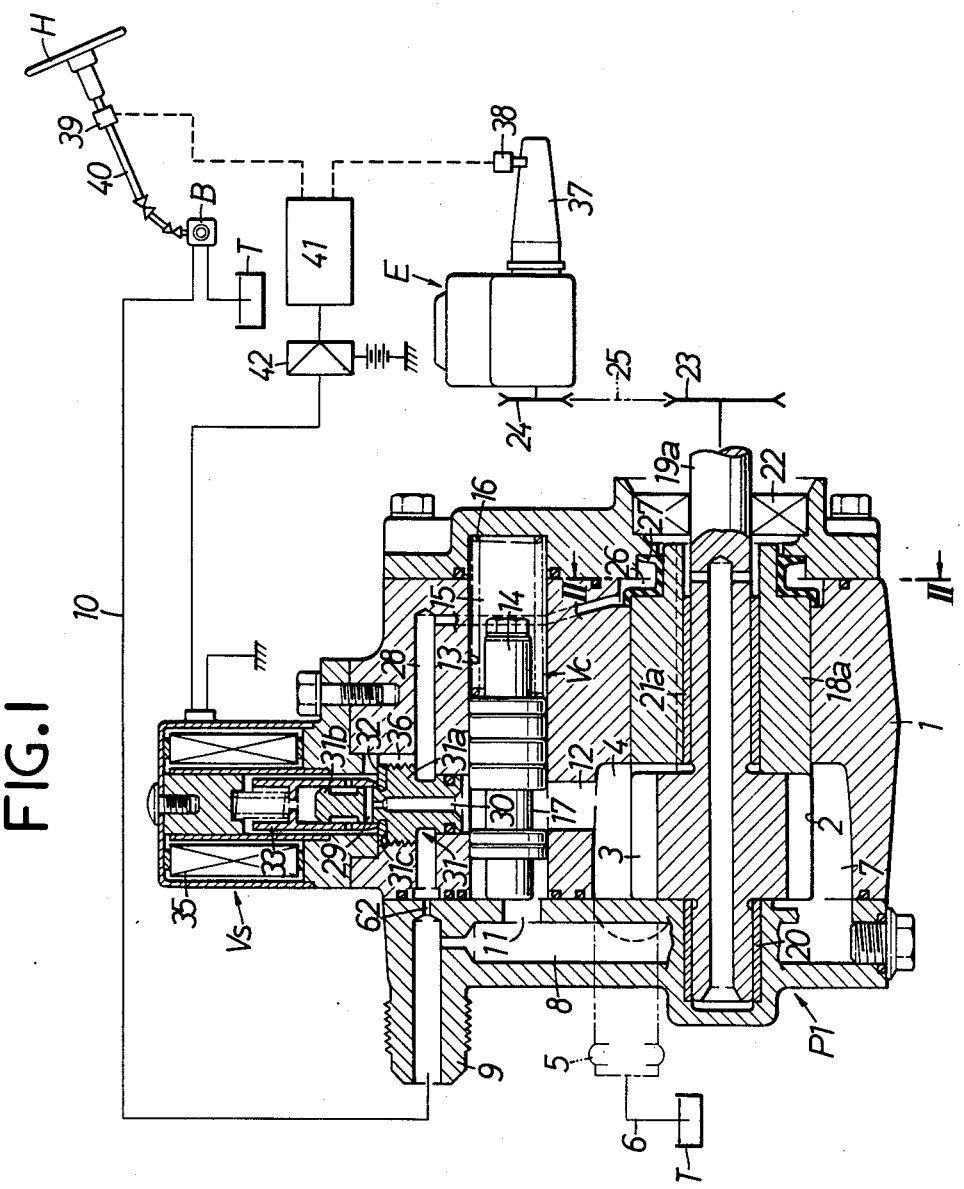

Embodiments of the present invention will now be described with reference to the drawings. First, referring to FIG. 1, a hydraulic pump P1 is driven by an engine E mounted on a vehicle, and oil discharged from this hydraulic pump P1 is introduced into a gear box B. The gear box B is provided therein with a change-over valve (not shown) the position of which is switched by turning a steering wheel H, and the oil discharged from the pump P1 is supplied alternately to left and right hydraulic chambers in a power cylinder (not shown) through switching operations of the valve. This assists the steering operation of the vehicle. When the steering wheel H is kept in a straight ahead position, the change-over valve takes up the neutral position, so that the pressure oil from the hydraulic pump P1 is returned to an oil tank T.

The hydraulic pump P1 is a gear pump, and a pair of gears 3 which are meshed with each other are housed rotatably in a pump chamber 2 formed in a pump case 1. A suction port 4 is provided in the pump casing 1 so that the suction port 4 is opened into the pump chamber 2 at a disengaging side of the gears 3. A suction pipe 6 communicating with the oil tank T is connected to a suction joint pipe 5 which is provided in the pump casing 1 so as to communicate with the suction port 4. The pump casing 1 is further provided with a discharge port 7 opened into the pump chamber 2 at an engaging side of the gears 3, a discharge oil passage 8 which communicates with the discharge port 7, and a discharge joint pipe 9 which communicates with the discharge oil passage 8. A discharge pipe 10 is connected between the discharge joint pipe 9 and the change-over valve provided in the gear box B.

A return oil passage 11 branches from an intermediate portion of the discharge oil passage 8, and a flow rate control valve Vc is provided between the return oil passage 11 and a return oil passage 12 which communicates with the suction port 4. This flow rate control valve Vc is a spool valve, and has a spool valve body 14 fitted slidably in a slide bore 13 which is made in the pump casing 1. The left end of the slide bore 13 communicates eccentrically with the return oil passage 11, and a spring chamber 15 is formed between the right end of the slide bore 13 and the spool valve body 14. A spring 16 urging the spool valve body 14 leftward is provided in the spring chamber 15. The return oil passage 12 which communicates with the suction port 4 is opened at the inner surface of an axially intermediate portion of the slide bore 13, and the spool valve 14 is provided with an annular groove 17.

In the flow rate control valve Vc, the discharge hydraulic pressure flowing thereinto from the return oil passage 11 works on the left end of the spool valve body 14. When the force of the discharge hydraulic pressure applied to the spool valve body 14 to move the same rightward is less than the force of the spring 16 for moving the spool valve body 14 leftward, the return oil passages 11, 12 are shut off from each other by the spool valve body 14 as shown in the drawing. When the force due to the discharge hydraulic pressure and applied to the spool valve body 14 to move the same rightward overcomes the force of the spring 16 for moving the spool valve body 14 leftward, the spool valve body 14 moves rightward, so that the two return oil passages 11, 12 communicate with each other. The discharge rate of the pressure oil is thus controlled so that the discharge pressure at the discharge oil passage 8 does not exceed a predetermined level which is fixed in response to a set load of the spring 16.

Figure 2:
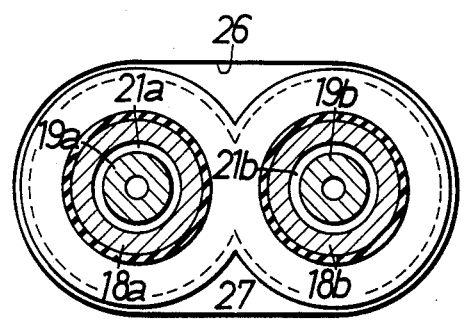

Referring to both FIGS. 1 and 2, the region of the inner side wall of the pump chamber 2 which is on one side of both the gears 3 along their axes of rotation is constituted by the end surfaces at one end of plungers 18a, 18b which are fitted in the pump casing 1 and serve as a pair of pressure members displaceable in the direction along the axes of rotation of the gears 3. These plungers 18a, 18b are arranged correspondingly to the gears 3. Rotary shafts 19a, 19b are provided unitarily on the gears 3, respectively, and are supported in the pump casing 1 via bearings 20 and also in the plungers 18a, 18b via bearings 21a, 21b. Moreover, the rotary shafts 19a, 19b extend concentrically through the plungers 18a, 18b, respectively, and are sealed at the portions thereof which project from the plungers 18a, 18b, with a seal member 22. One rotary shaft 19a projects further outward from the seal member 22, and a pulley 23 is mounted fixedly on this projecting end portion of the shaft 19a. An endless belt 25 is wound around this pulley 23 and a pulley 24 mounted fixedly on a crankshaft of the engine E, and the two gears 3 are rotated in accordance with the operation of the engine E.

At the side opposite the pump chamber 2, a hydraulic chamber 26 is defined by the pump casing 1 and the other ends of the plungers 18a, 18b. In this hydraulic chamber 26, a rubber cap 27 for sealing between the plungers 18a, 18b and holding these plungers in an integral manner is fitted around the other ends or right-hand ends of the plungers. This cap 27 receives the hydraulic pressure in the hydraulic chamber 26. An oil passage 28, which communicates with the hydraulic chamber 26, communicates with an intermediate portion of the discharge oil passage 8 through an orifice 62, and the discharge oil pressure from the discharge oil passage 8 is applied to the hydraulic chamber 26. With this construction, frictional loss can be reduced by controlling side clearance of the hydraulic pump P1 in response to the discharge oil pressure. In practice, however, the plungers 18a, 18b are pressed lightly against the side surfaces of the gears 3 despite built-in tolerance.

Accordingly, when it is desired to reduce supplementary power, the hydraulic chamber 26 is made to communicate with the suction port 4 to release the pressure therein, and an intermediate portion of the oil passage 28 and the suction port 4 are joined by an electromagnetic change-over valve Vs so as to reduce the frictional loss of the hydraulic pump.

The electromagnetic change-over valve Vs provided in the portion of the pump casing 1 which is on an extension of the axis of the return oil passage 12 communicating with the suction port 4. This electromagnetic valve Vs includes a passage member 31, which is disposed across the intermediate portion of the oil passage 28 so as not to intercept the same oil passage, and which is provided with a valve port 29 and a passage 30 communicating with the valve port 29; a valve seat member 32 fitted around the passage member 31; a cylindrical valve body 33 adapted to be moved toward and away from the valve seat member 32 and thereby close and open the valve port 29; a spring 34 urging the valve body 33 in the closing direction; and a solenoid 35 adapted to open the valve body 33 against the resilient force of the spring 34 when the solenoid is excited.

The passage member 31 has a large-diameter region 31a screwed to the casing 1, and a small-diameter region 31b connected to the large-diameter region 31a via a stepped region 31c. The large-diameter region 31a is provided therein with the passage 30 which communicates constantly with the oil passage 12 via the annular groove 17 on the spool valve body 14. The small-diameter region 31b is provided therein with the valve port 29 opened at a side portion of the region 31b. The valve seat member 32 is fitted firmly in the stepped region 31c. Valve body 33 is fitted movably around the small-diameter region 31b. When the valve body 33 engages the valve seat member 32, the valve port 29 is closed, and when the valve body 33 disengages from the valve seat member 32, the valve port 29 is opened. A passage 36 which communicates with the oil passage 28 is formed around the passage member 31, and is adapted to communicate with the valve port 29 when the valve body 33 disengages from the valve seat member 32.

To detect the moment when supplementary power should be reduced, a vehicle speed sensor 38 is provided as a detector on a transmission 37 attached to the engine E. A steering angle sensor 39 is provided as a detector on a steering shaft 40. Signals from these two sensors 38, 39 are input into a processor 41 consisting of a microcomputer. The processor 41 is adapted to excite the solenoid 35 of the electromagnetic change-over valve Vs through an amplifier 42 when the vehicle speed is not less than a predetermined level with the steering angle not greater than a predetermined level, or when these conditions are established independently.

The operation of this embodiment will now be described. When supplementary power is required, i.e., when the vehicle speed is less than a predetermined level with the steering angle exceeding a predetermined level or when these conditions are established independently, the solenoid 35 of the electromagnetic change-over valve Vs is turned off, and the valve body 33 engages the valve seat member 32 to close the valve port 29. The hydraulic pressure from the discharge oil passage 8 works on the oil in the hydraulic chamber 26, and the plungers 18a, 18b are pressed against the right-hand side surfaces of the gears 3 in response to a difference between the pressure in the pump chamber 2 and that in the hydraulic chamber 26.

When supplementary power should be reduced, for example, when the vehicle runs straight forward at a high speed, the solenoid 35 is excited to move the valve body 33 apart from the valve seat member 32 to cause the valve port 29 to be opened. As a result, the hydraulic chamber 26 communicates with the suction port 4 via the oil passages 28, 36, valve port 29, passage 30, annular groove 17 and return oil passage 12. Consequently, the hydraulic pressure in the hydraulic chamber 26 decreases and the plungers 18a, 18b move rightward to increase the clearance between the plungers and the right-hand side surfaces of the gears 3 to a relatively high level. During this time, any sudden decrease in the pressure in the discharge oil passage 8 is prevented by the operation of the orifice 62. Frictional loss is thus reduced, so that power consumption of the engine E can be minimized. Experiments conducted by the present inventor indicate that power consumption of the hydraulic pump P1 can be reduced by about 75% by setting the mentioned side clearance to about 1.2 mm when the pump P1 runs at 4000 r.p.m.

Figure 3:
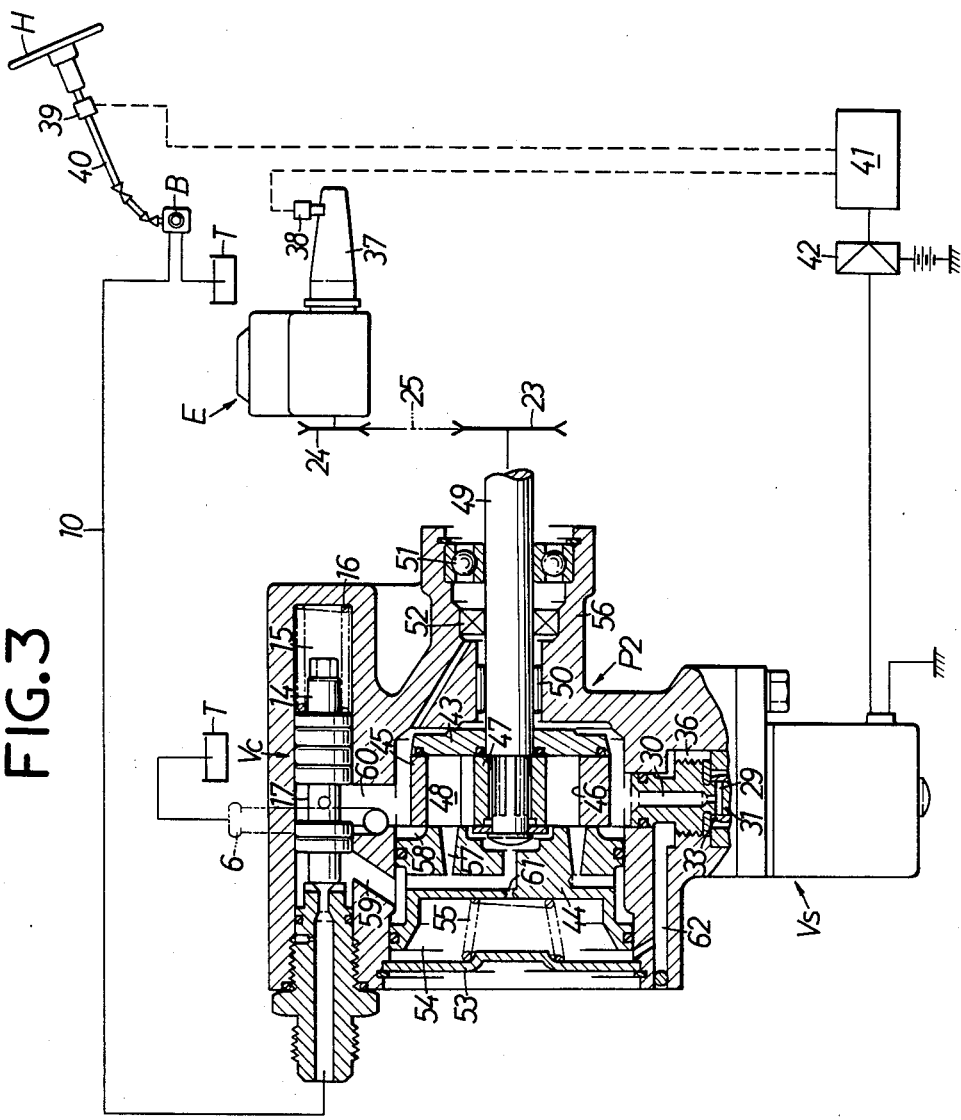
FIG. 3 is a sectioned side elevation of a second embodiment of the present invention.

FIG. 3 shows a second embodiment of the present invention. The parts of this embodiment which correspond to those of the first embodiment are designated by the same reference numerals and characters. In this embodiment, hydraulic pump 2 is a vane pump, and includes a pump chamber 46 defined by a bushing side member 43, a pressure plate 44 as a pressure member and a cam ring 45; and a rotor 47 housed rotatably in the pump chamber 46 and provided with a plurality of vanes 48 which are movable in the radial direction of the rotor 47. A rotary shaft 49 spline-connected to the rotor 47 extends through the bushing side member 43 and is supported rotatably on a pump casing 56 via bearings 50, 51. A pulley 23 which transmits the driving force from the engine E is mounted fixedly on an end section of the region of the rotary shaft 49 which projects from the pump casing 56. A seal member 52 is provided between the rotary shaft 49 and pump casing 56 at a location between the bearings 50, 51.

The pressure plate 44 is fitted slidably in the pump casing 56 so that the pressure plate 44 can be moved along the axis of the rotary shaft 49. A hydraulic chamber 54 is defined by an end plate 53, which is fixed to the casing 56 on the side opposite the pump chamber 46, and the pressure plate 44. A spring 55 urging the pressure plate 44 toward the rotor 47 is housed in this hydraulic chamber 54. A discharge port 57 and a suction port 58 are formed in the pressure plate 44, and a discharge oil passage 59 and a suction oil passage 60 formed in the pump casing 56 communicate with the discharge port 57 and suction port 58, respectively. The pressure plate 44 is further provided therein with an orifice 61 to communicate the hydraulic chamber 54 and the discharge port 57.

The pump casing 56 is provided with an oil passage 62 which communicates with the hydraulic chamber 54, and the oil passage 62 and the suction oil passage 60 are joined by electromagnetic change-over valve Vs.

The operation of the second embodiment will now be described. When supplementary power is required, the electromagnetic change-over valve Vs is closed, and discharge hydraulic pressure from the discharge port 57 is supplied to the hydraulic chamber 54 via the orifice 61. The pressure plate 44 is pressed against the rotor 47 and cam ring 45 due to the resilient force of the spring 55 and the discharge hydraulic pressure, so that pressure oil is discharged from the hydraulic pump P2 in a highly efficient manner. When it is desired to reduce the quantity of supplementary power, the electromagnetic change-over valve Vs is opened to reduce the pressure in the hydraulic chamber 54, so that the pressure plate 44 is displaced to a position in which the rightward force based on the reduced hydraulic pressure and the resilient force of the spring 55, and the leftward force based on the hydraulic pressure in the pump chamber 46 are balanced. As a result, the side clearance between the pressure plate 44 and the rotor 47 and cam ring 45 is made relatively large, and the frictional loss of the hydraulic pump decreases. With this operations, the power consumption of the hydraulic pump P2 can be reduced by 85%.

The present invention can be embodied in another way, in which the bushing side member 43 employed in the second embodiment is also set axially movable as a pressure plate.

In the present invention, as mentioned above, the pressure member which defines an inner side wall of a pump chamber on at least one axial side of a rotary shaft of a hydraulic pump is provided in a pump casing in such a manner as to be movable in the axial direction, and a hydraulic chamber, which is provided on the side of the pressure member opposite the pump chamber and to which an end portion of the pressure member faces, communicates with a discharge port of the hydraulic pump, the hydraulic chamber and a suction port of the hydraulic pump being capable of communicating together through an electromagnetic change-over valve which is adapted to be opened in accordance with a signal from a detector which detects the moment when supplementary power should be reduced. Therefore, the discharge efficiency of the hydraulic pump can be improved when supplementary power is needed, and the frictional loss of the hydraulic pump can be reduced when supplementary power should be reduced. Consequently, the power consumption of the hydraulic pump and engine can be minimized. Moreover, the device according to the present invention can be obtained merely by adding a pressure member, on electromagnetic change-over valve and a detector to a conventional device of this kind; it is unnecessary to greatly change the design of the conventional device when the device according to the present invention is produced.

The present invention is not, of course, limited to the above embodiments; it may be modified in various ways within the scope of the appended claim.

What is claimed is:

1. A power steering device for supplementary power for the steering of vehicles, said power steering device comprising a hydraulic pump, said hydraulic pump including a pump casing, a rotary shaft having an axis, a pump chamber defined in said pump casing, and a suction port and a discharge port, wherein a pressure member is provided in said pump casing on at least one axial side of said rotary shaft and constitutes an inner side wall of said pump chamber, said pressure member being movable along the axis of said rotary shaft; a hydraulic chamber on a side of said pressure member opposite said pump chamber, said hydraulic chamber faces an end portion of said pressure member and communicates with said discharge port of said hydraulic pump; an electromagnetic change-over valve for interconnecting said hydraulic chamber and said suction port of said hydraulic pump; detector means for sensing at least one of the speed and the steering angle of said vehicle; and means interconnecting said detector means and said electromagnetic change-over valve for actuating said valve and interconnecting said hydraulic chamber and said suction port when said at least one of the speed and the steering angle detected by said detector means passes a limit predetermined to indicate that supplementary power for steering is not required.

2. A power steering device for vehicles as claimed in claim 1, wherein said hydraulic pump is a gear pump including a pair of gears meshing with each other, each of said gears having a rotary shaft and said pressure member comprises a pressure element on each of said rotary shafts.

3. A power steering device for vehicles as claimed in claim 1, wherein said hydraulic pump is a vane pump.

4. A power steering device for vehicles as claimed in claim 1, wherein said hydraulic chamber and said suction port are interconnected when said detector means senses that the vehicle speed exceeds a predetermined level and concurrently the steering angle is smaller than a predetermined level.

5. A power steering device for vehicles as claimed in claim 1, wherein said hydraulic chamber and said discharge port are interconnected via an orifice.

* * * * *